Nov. 19, 1957  L. D. PICKETT  2,813,971
HEADLIGHT FOR VEHICLES
Filed Aug. 14, 1956
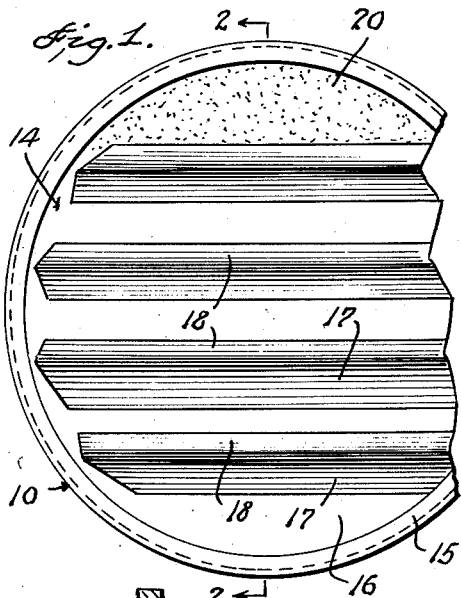
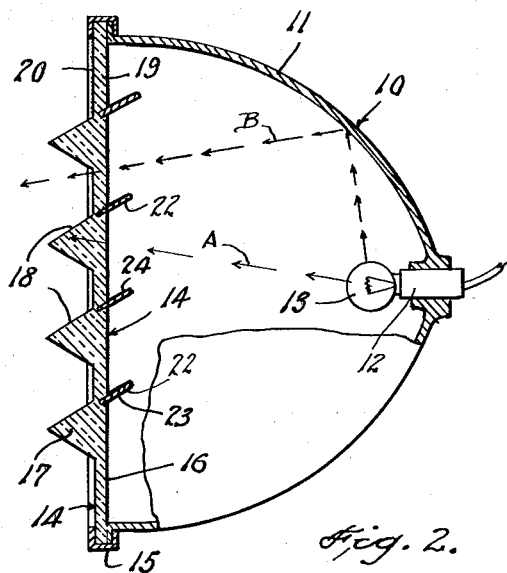
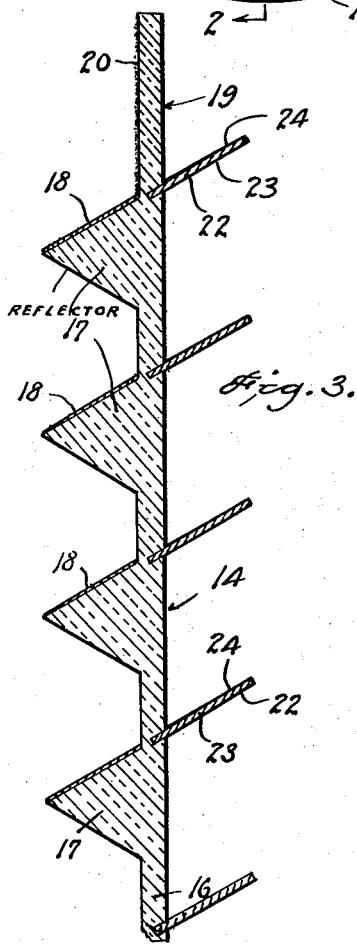
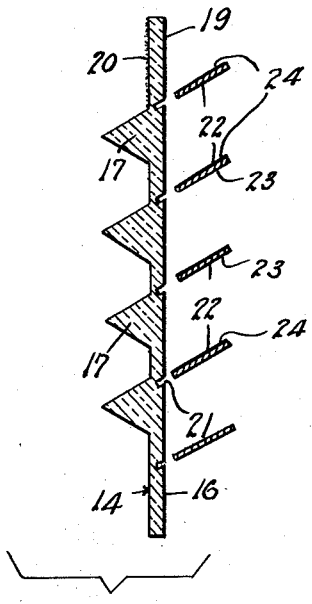
LESTER D. PICKETT INVENTOR
BY
ATTORNEYS.

United States Patent Office 2,813,971
Patented Nov. 19, 1957

2,813,971
HEADLIGHT FOR VEHICLES

Lester D. Pickett, Dunkirk, N. Y.

Application August 14, 1956, Serial No. 603,954

1 Claim. (Cl. 240—41.4)

This invention relates to headlights.

An object of this invention is to provide an improved headlight for vehicles which is of the non-glare type.

Another object of this invention is to provide a non-glare headlight lens which includes a glass member having upwardly inclined inwardly projecting metallic shields or baffles which extend horizontally across the glass member.

A further object of this invention is to provide a non-glare headlight lens which includes a glass member having metallic upwardly extending shields or baffles on the inner side thereof and horizontal ribs or facets on the outer side thereof, the ribs or facets being of triangular shape in transverse section and provided with an opaque non-reflecting coating on the upper side thereof.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Fig. 1 is a detailed front elevation partly broken away of a headlight constructed according to an embodiment of this invention.

Fig. 2 is a vertical section taken through the device on line 2—2 of Fig. 1.

Fig. 3 is a vertical section partly broken away on an enlarged scale taken through the lens.

Fig. 4 is an exploded view in vertical section showing the lens with non-transparent baffles which are adapted to be secured to the inner side of the lens.

Referring to the drawing the numeral 10 designates generally a headlight structure which embodies a reflector 11 having a socket 12 in the center thereof and a light bulb 13 mounted within the socket 12.

A lens generally indicated at 14 is secured to the front of the reflector 11 being secured by means of a U-shaped rim 15. The lens 14 is constructed in the form of a transparent disc 16 and the disc 16 has projecting from the forward side thereof a plurality of vertically spaced apart ribs 17. These ribs 17 form facets and are of a triangular configuration in vertical section.

Each rib 17 has disposed on the upper side thereof a coating 18 which may be of opaque material such as black paint or enamel. That portion of the disc 16 which projects above the uppermost one of the ribs or facets 17 indicated by the numeral 19 is frosted as at 20 on the outer side thereof so as to provide a substantially translucent upper portion for the lens.

The disc 16 is formed on the inner side thereof with a plurality of horizontally disposed slots 21 and a metallic baffle 22 is firmly embedded in each slot 21. These baffles 22 are disposed at an inclination to the vertical and are substantially coplanar with the upper side of each facet or rib 17. These baffles 22 provide a deflector by means of which light rays are prevented from passing upwardly and outwardly through the lens 14 in the space between the facets 17. These baffles 22 are provided with reflecting lower surfaces and with non-reflecting upper surfaces. The lower surface of each baffle is indicated at 23 and the upper non-reflecting surface of each baffle 22 is indicated at 24.

With a lens structure as hereinbefore described the light rays from the light bulb 13 which are direct light rays as indicated at A in Fig. 2 will extend forwardly and will pass through the lens body 16 and will be deflected downwardly by the facets 17 and by engagement with the lower reflecting surfaces 23 of the intermediate or middle baffles 22. The light rays which are reflected rays from the reflector 11 and indicated at B will pass forwardly and downwardly through the lens structure 14. The lens structure hereinbefore described will prevent any glaring light rays from passing outwardly and upwardly through the lens of the headlight so that the headlight will be a non-glaring type while at the same time providing sufficient lighting for operation of the vehicle in the dark.

What is claimed is:

A non-glare lens comprising a disc-shaped glass body, a plurality of horizontal ribs on one side of said body, said ribs being spaced apart vertically and in the form of triangles in transverse section, a plurality of flat horizontal and vertically spaced apart baffles embedded at their forward ends in the opposite side of said body, said baffles being inclined to the vertical and disposed coplanar with the upper inclined sides of said triangular shaped ribs, and a non-reflecting coating on the upper side of each rib.

References Cited in the file of this patent

UNITED STATES PATENTS

| 1,280,953 | Bone | Oct. 8, 1918 |
| 1,413,415 | McPeek | Apr. 18, 1922 |
| 1,429,067 | Dole | Sept. 12, 1922 |
| 1,773,831 | Walthers | Aug. 26, 1930 |

FOREIGN PATENTS

| 245,948 | Great Britain | Jan. 21, 1926 |
| 1,095,680 | France | Dec. 22, 1954 |